United States Patent Office 2,872,489

Patented Feb. 3, 1959

2,872,489

α-SUBSTITUTED CHLOROCRESOLS

Andrew J. Dietzler and Fred Bryner, Midland, Mich., assignors to The Dow Chemical Company, Midland, Mich., a corporation of Delaware No Drawing. Application April 13, 1956
Serial No. 577,962

3 Claims. (Cl. 260—619)

This invention is concerned with α-substituted chlorocresols having the formula:

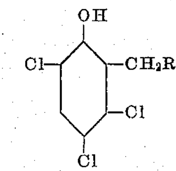

In this and succeeding formula R represents an aryl radical of the benzene series selected from a group consisting of phenyl, halophenyl and alkylphenyl. These new compounds are usually white crystalline solids. They are generally soluble in aqueous sodium hydroxide solution and in many common organic solvents such as acetone, chloroform, carbon tetrachloride and alcohol; they are of very low solubility in water. These compounds are valuable agents for the control of fungi, and are particularly useful for the protection of seeds, plants and plant parts from the attack of fungal organisms.

The new α-substituted chlorocresols may be prepared by causing a benzyl ether of 2,4,5-trichlorophenol having the formula:

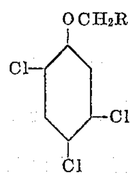

to rearrange by heating the ether in the presence of 2,4,5-trichlorophenol and aluminum chloride. In the preparation, the reactants are mixed and heated over the temperature range of from 90° C. to 130° C. for several hours, whereupon a reaction takes place with the formation of the desired product. The amounts of 2,4,5-trichlorophenol and aluminum chloride employed are not critical. Good results are obtained by using the phenol in an amount of from one-tenth to an equimolar proportion of the employed benzyl ether. Aluminum chloride is used in catalytic amounts.

In the preferred method of carrying out the reaction, the benzyl ether and trichlorophenol are stirred together and heated. Anhydrous aluminum chloride is added and the stirring and heating continued for two to four hours. At the end of this period, a small amount of water and sodium carbonate are added to the mixture and stirred for one-half to one hour to neutralize the acidic constituents of the mixture. A warm inert solvent such as chlorobenzene is then added to dissolve the phenolic substances and the mixture filtered while warm to remove the inorganic salts. The filtrate is fractionally distilled to recover an α-substituted chlorocresol product. The product may be purified by recrystallizing from an inert solvent such as methylcyclohexane.

The following examples illustrate the invention, but are not to be construed as limiting.

*Example 1.—3,4,6-trichloro-α-phenyl-o-cresol*

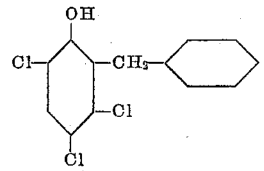

100.5 grams (0.35 mole) of benzyl 2,4,5-trichlorophenyl ether, 69 grams (0.35 mole) of 2,4,5-trichlorophenol and 2.8 grams (0.021 mole) of anhydrous aluminum chloride were combined and heated at 110° to 128° C. for 2.25 hours while stirring. 3 milliliters of water and 3.4 grams of sodium carbonate were added and the mixture stirred for 0.75 hour at 80° to 90° C. The warm mixture was filtered with the aid of Filtercel to remove the phenolic compounds from the inorganic salts. The filter cake was washed with warm carbon tetrachloride and the combined filtrate fractionally distilled. The 3,4,6-trichloro-α-phenyl-o-cresol product was obtained from a fraction boiling in the range of 178° to 200° C. at 3 millimeters pressure. After recrystallization from toluene, the product melted at 105.2°–106° C. and had a chlorine content of 36.9 percent. The theoretical value for chlorine is 37.0 percent.

*Example 2.—3,4,6-trichloro-α-(o-tolyl)-o-cresol*

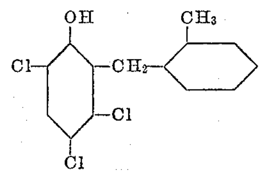

100.5 grams (0.33 mole) of o-methylbenzyl 2,4,5-trichlorophenyl ether and 10 grams (0.03 mole) of 2,4,5-trichlorophenol were combined and heated to 100° C. with stirring. 0.1 gram of anhydrous aluminum chloride was added and the mixture stirred and maintained in the temperature range of from 94° to 120° C. for 3.5 hours. 0.3 milliliter of water and 0.25 gram of sodium carbonate were added to the reaction mixture while the latter was maintained at 85°–90° C. The mixture was stirred at this temperature for 30 minutes. Chlorobenzene was then added and the mixture filtered while warm. The solid cake was washed with chlorobenzene. The filtrates were combined and fractionally distilled to obtain a 3,4,6-trichloro-α-(o-tolyl)-o-cresol product boiling from about 183° to 200° C. at 3 millimeters' pressure. The latter solidified on cooling and was recrystallized from methylcyclohexane to obtain the purified product, melting at 104.5°–105.5° C. in a 54.6 percent yield. The compound had a chlorine analysis of 35.13 percent, the theoretical value being 35.3 percent.

*Example 3.—3,4,6-trichloro-α-(p-chlorophenyl)-o-cresol*

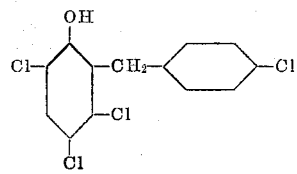

107.7 grams (0.33 mole) of p-chlorobenzyl 2,4,5-trichlorophenyl ether and 10 grams (0.05 mole) of 2,4,5-trichlorophenol were combined and heated to 100° C. 0.23 gram of anhydrous aluminum chloride was added while stirring. The temperature rose during the addition. The mixture was cooled to 90° C. and maintained between 90° to 110° C. for 3.5 hours. 1 milliliter of water and 0.3 gram of sodium carbonate was stirred into the warm solution and the mixture maintained at from 95° to 100° C. for 30 minutes. Chlorobenzene was added to the mixture, and the chlorobenzene soluble phenolic substance separated from the inorganic salts by filtration. The filter cake was washed with hot chlorobenzene and the combined filtrates fractionally distilled. A fraction distilling from about 200° to 215° C. at 3 millimeters pressure solidified on cooling to give the 3,4,6-trichloro-α-(p-chlorophenyl)-o-cresol product. The latter, after recrystallization from methylcyclohexane, melted at 106.8°–107.5° C. and amounted to 87.5 grams. Elemental analysis gave 43.8 percent chlorine, the theoretical value being 44.0 percent.

*Example 4.—3,4,6-trichloro-α-(3,4-dichlorophenyl)-o-cresol*

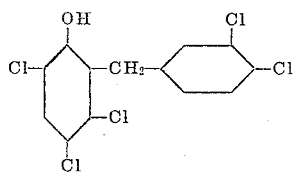

107 grams (0.3 mole) of 3,4-dichlorobenzyl 2,4,5-trichlorophenyl ether and 10 grams (0.05 mole) of 2,4,5-trichlorophenol were combined and heated to 100° C. 0.35 gram of anhydrous aluminum chloride was added with stirring. The stirring was continued while the mixture was maintained in the temperature range of from 110° to 130° C. for a total time of 9.75 hours. At the end of this period, 1.8 grams of sodium carbonate and 2 milliliters of water was added thereto and the resulting mixture stirred for 0.5 hour while the temperature was kept at from 90° to 100° C. 75 milliliters of chlorobenzene was then added and the resulting mixture filtered at 90° C. The filtrate was fractionally distilled to obtain a 3,4,6-trichloro-α-(3,4-dichlorophenyl)-o-cresol product boiling from 225° C. to 245° C. at 3 millimeters pressure. On cooling, the latter solidified to a compound which after recrystallization from methylcyclohexane-petroleum ether melted from 91° to 95° C. The product had a chlorine content of 49.47 percent, the theoretical being 49.7 percent.

*Example 5.—3,4,6-trichloro-α-(x-secondary-butylphenyl)-o-cresol*

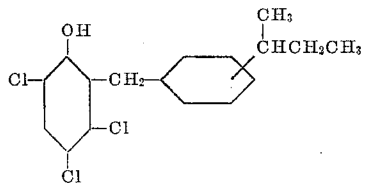

100 grams (0.29 mole) of x-secondary-butylbenzyl 2,4,5-trichlorophenyl ether (a benzyl ether of 2,4,5-trichlorophenol containing a secondary butyl group in the aromatic nucleus of the benzyl radical) and 10 grams (0.05 mole) of 2,4,5-trichlorophenol were combined and heated to 104° C. 0.5 gram of anhydrous aluminum chloride was added thereto with stirring. The temperature rose to 160° C. during the addition. The mixture was cooled to 120° C. and maintained between 117° to 124° C. for 3.25 hours. Another 0.5 gram of anhydrous aluminum chloride was then added and the resulting mixture kept in the temperature range of from 117° to 122° C. for an additional three hours. The mixture was cooled to 90° C. and 2 milliliters of water and 2 grams of anhydrous sodium carbonate were added thereto with stirring to neutralize the acidic constituents therein. The mixture was maintained at that temperature for 0.5 hour. 75 milliliters of chlorobenzene was then added to dissolve the phenolic substance and the resulting solution separated from the insoluble organic salts by filtration. The filtrate was fractionally distilled to obtain a 3,4,6-trichloro-α-(x-secondary-butylphenyl)-o-cresol product boiling from 215° to 230° C. at 5 millimeters pressure. The product contained 29.45 percent chlorine compared to a theoretical value of 31.0 percent.

In a similar manner other α-substituted chlorocresols may be prepared as follows.

3,4,6-trichloro-α(p-fluorophenyl) - o - cresol by heating p-fluorobenzyl 2,4,5-trichlorophenyl ether in the presence of 2,4,5-trichlorophenol and aluminum chloride.

3,4,6-trichloro-α(2-methyl - 4 - ethylphenyl) - o - cresol by heating 2-methyl-4-ethylbenzyl 2,4,5-trichlorophenyl ether in the presence of 2,4,5-trichlorophenol and aluminum chloride.

3,4,6-trichloro-α(o-bromophenyl)-o-cresol by heating o-bromobenzyl 2,4,5-trichlorophenyl ether in the presence of 2,4,5-trichlorophenol and aluminum chloride.

These new compounds are useful for the control of fungal growth, particularly those affecting seeds, plants and plant parts. In a representative operation, the growth of *Fusarium oxysporum lycopersici* and *Rhizoctonia solani* was completely inhibited on rosebengal-streptomycin agar plates containing 100 parts per million of 3,4,6-trichloro-α-phenyl-o-cresol.

We claim:

1. An α-substituted chlorocresol having the formula

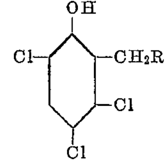

wherein R represents a lower alkylphenyl radical.

2. 3,4,6-trichloro-α-(x-secondary-butylphenyl)-o-cresol.

3. 3,4,6-trichloro-α-(o-tolyl)-o-cresol.

References Cited in the file of this patent

UNITED STATES PATENTS

| | | |
|---|---|---|
| 1,880,566 | Weiler et al. | Oct. 4, 1932 |

FOREIGN PATENTS

| | | |
|---|---|---|
| 667,403 | Great Britain | Feb. 27, 1952 |
| 884,416 | France | Apr. 27, 1943 |

OTHER REFERENCES

Klarmann et al.: Jour. Amer. Chem. Soc., vol. 54, pp. 3315–18 (August 1932), 4 pp.; entire article, pp. 3315–3328.

Huston et al.: Jour. Amer. Chem. Soc., vol. 55, pp. 4639–40 (November 1933), 2 pp.; entire article, pp. 4639–4643.